United States Patent [19]
Sanderson

[11] 3,801,033
[45] Apr. 2, 1974

[54] APPARATUS FOR EASILY ENGAGING, DISENGAGING AND LOCKING LOAD TO ROTATABLE DRIVING ELEMENT

[75] Inventor: Robert Arthur Sanderson, Wayland, Mass.

[73] Assignee: RCA Corporation, New York, N.Y.

[22] Filed: Dec. 17, 1971

[21] Appl. No.: 209,307

[52] U.S. Cl. .................. 242/68.3, 192/43.1, 192/75
[51] Int. Cl. .................. B65h 19/02, F16d 13/04
[58] Field of Search .......... 242/68.3, 68.2, 72, 46.3, 242/46.4; 192/43.1, 74, 75

[56] References Cited

UNITED STATES PATENTS

| | | | |
|---|---|---|---|
| 3,545,695 | 12/1970 | Patton | 242/68.3 |
| 3,645,464 | 2/1972 | Herger | 242/68.3 |
| 2,928,620 | 3/1960 | Stavrakis | 242/68.3 |
| 3,379,388 | 4/1968 | Gruczelak | 242/68.3 |
| 2,983,460 | 5/1961 | Wright | 242/68.3 |
| 3,366,343 | 1/1968 | Messamer | 242/68.3 |
| 1,312,776 | 8/1919 | Bridge | 192/75 |
| 676,335 | 6/1901 | Moffott | 242/46.3 |
| 775,850 | 11/1904 | Norcross | 242/46.4 |
| 2,156,089 | 4/1939 | Hinnekens | 242/68.2 |

*Primary Examiner*—John W. Huckert
*Assistant Examiner*—Edward J. McCarthy
*Attorney, Agent, or Firm*—Raymond E. Smiley; H. Christoffersen

[57] ABSTRACT

A load such as a tape reel is locked against rotation relative to a driving hub by a plurality of dogs. Each dog is pivotally mounted to the hub and includes a friction surface at its free end lightly engaging an annulus of the load. When the hub rotates, the friction surfaces lock to the annulus by wedging action, causing the load to rotate. The dogs and certain annulus engaging elements may be retracted concurrently to permit easy removal and engagement of the load.

19 Claims, 5 Drawing Figures

APPARATUS FOR EASILY ENGAGING, DISENGAGING AND LOCKING LOAD TO ROTATABLE DRIVING ELEMENT

BACKGROUND OF THE INVENTION

In many applications it is necessary securely to lock a load such as a tape reel onto a drive means such as a hub during rotation of the drive means and yet the load must be easy to remove when the drive means is at rest. In some applications one or more members extend from either the drive means or the load and engage notches in the other. However, when the load has no such special provision, it is common practice to employ some type of expandable means around the periphery of the drive means to frictionally engage the load. This is common practice, for example, in magnetic tape stations employing a driven hub to drive a magnetic tape reel mounted thereon. However, the force required to expand the expandable means is normally rather large and accomplished with difficulty, if at all, by some people.

SUMMARY OF THE INVENTION

The arrangement for locking the annulus of a load, to be driven by a hub, to the hub includes a dog pivotally mounted to the hub, a biasing means to urge the free end of the dog, on which is a frictional surface, into contact with the annulus of the load and a means attached to the hub for supporting a portion of the annulus generally opposite the portion of the annulus in contact with the dog. The pivotal axis of the dog lies behind a line joining the axis of rotation of the hub and the center of the frictional surface, relative to the intended direction of rotation, whereby when the hub is rotated in the intended direction wedging between the annulus and frictional surface tends to lock the dog and load together to cause the load to rotate with the hub.

DETAILED DESCRIPTION

Figure 1:
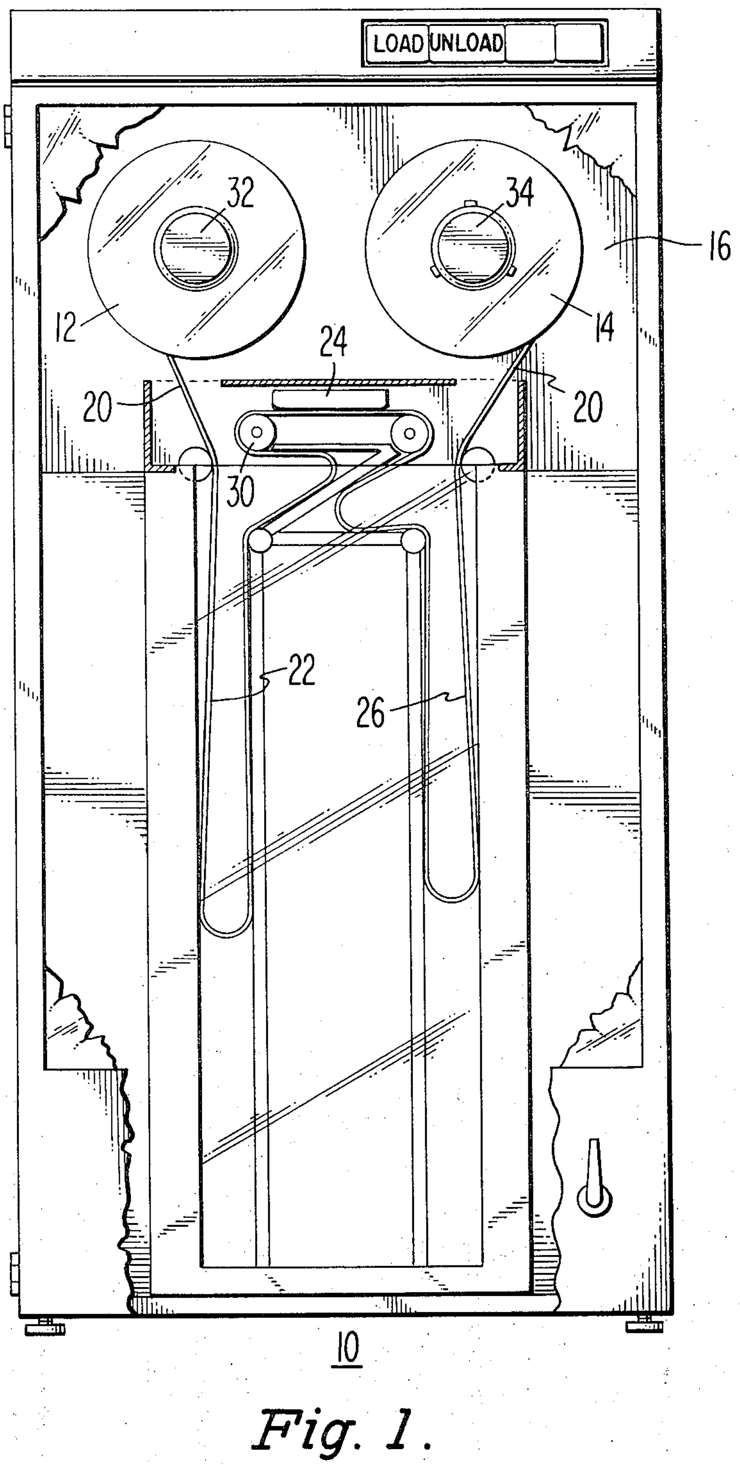
FIG. 1 is a front view of a magnetic tape station employing the tape reel hub of the present invention.

In FIG. 1 a magnetic tape station 10 includes two tape reels 12 and 14 rotatably mounted to a common plate 16. A magnetic tape 20 extends from tape reel 12 through a tape buffer 22 past a magnetic transducer assembly 24 through a second tape buffer 26 and thence to tape reel 14. Each of magnetic tape reels 12 and 14 may be independently rotated by conventional drive means (not shown) located behind and attached to plate 16. A capstan 30 is adapted to drive tape 20 in either direction past transducer assembly 24 where information may be read from or written onto the tape. As the capstan 30 and reels 12 and 14 may be driven at any given moment at different velocities, the tape buffers 22 and 26 serve to provide or take up slack in the tape caused by the variation in speed of the various rotational elements, as is well known in the art.

In tape stations it is conventional to have one tape reel such as reel 14 adapted to be easily removed from its hub 34 while the other reel 12 may be either removable or fixed to a rotatable hub 32.

Figure 2:
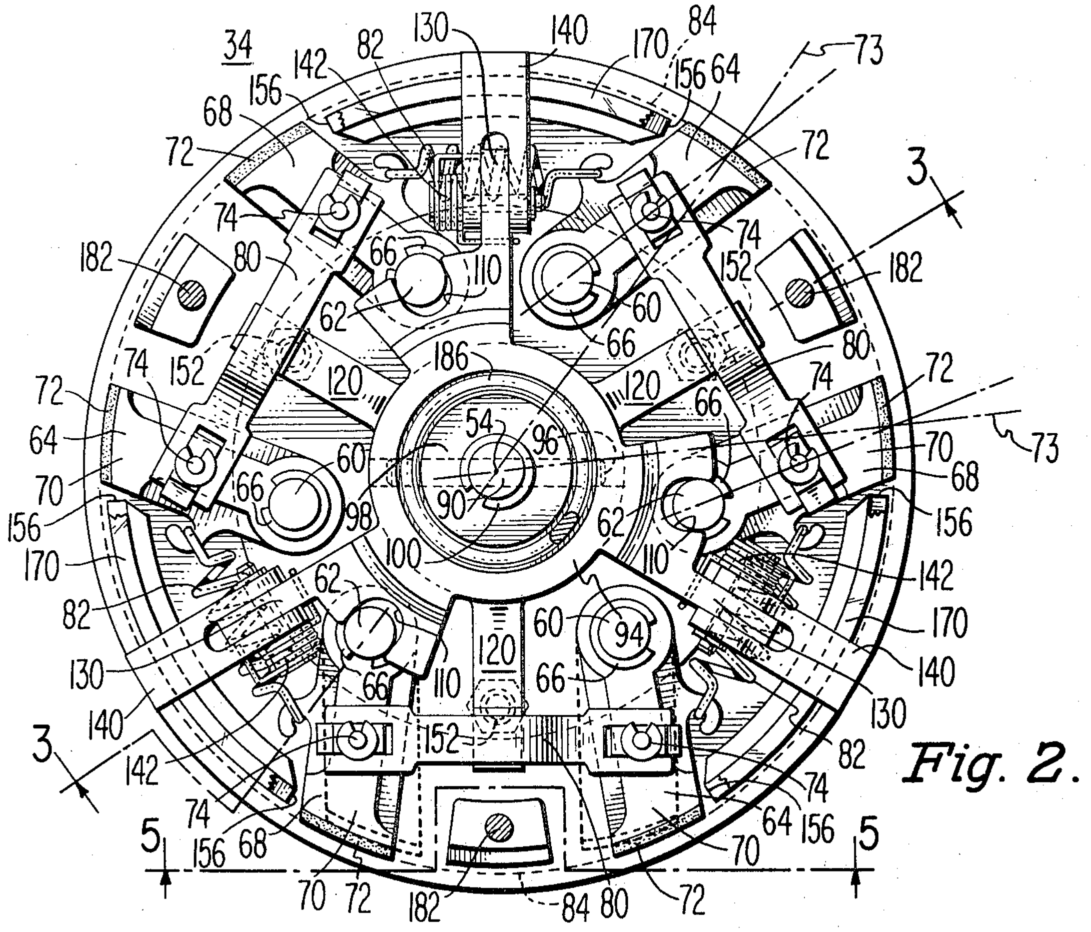
FIG. 2 is a plan view of a tape reel driving hub with the cover removed to show the elements in their operative positions.
Figure 3:
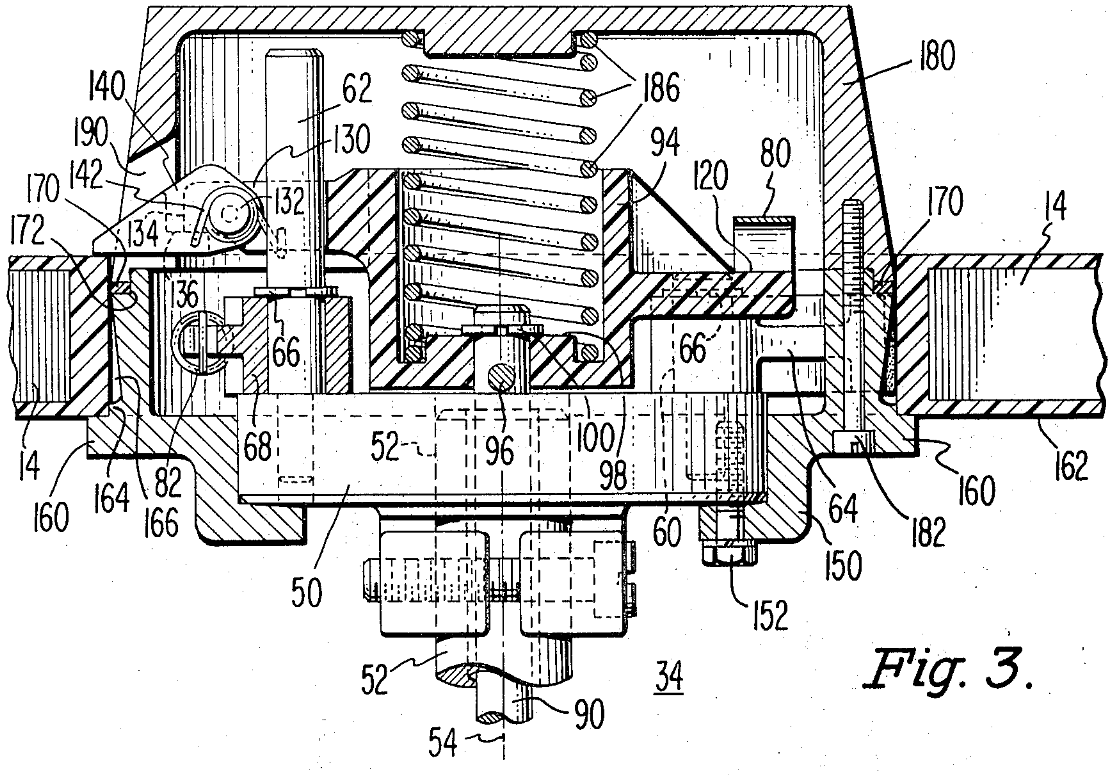
FIG. 3 is a cross-section substantially along lines 3—3 of FIG. 2 with all elements in positions to lock the tape reel to the hub and including the cover which is removed in FIG. 2.
Figures 4, 5:
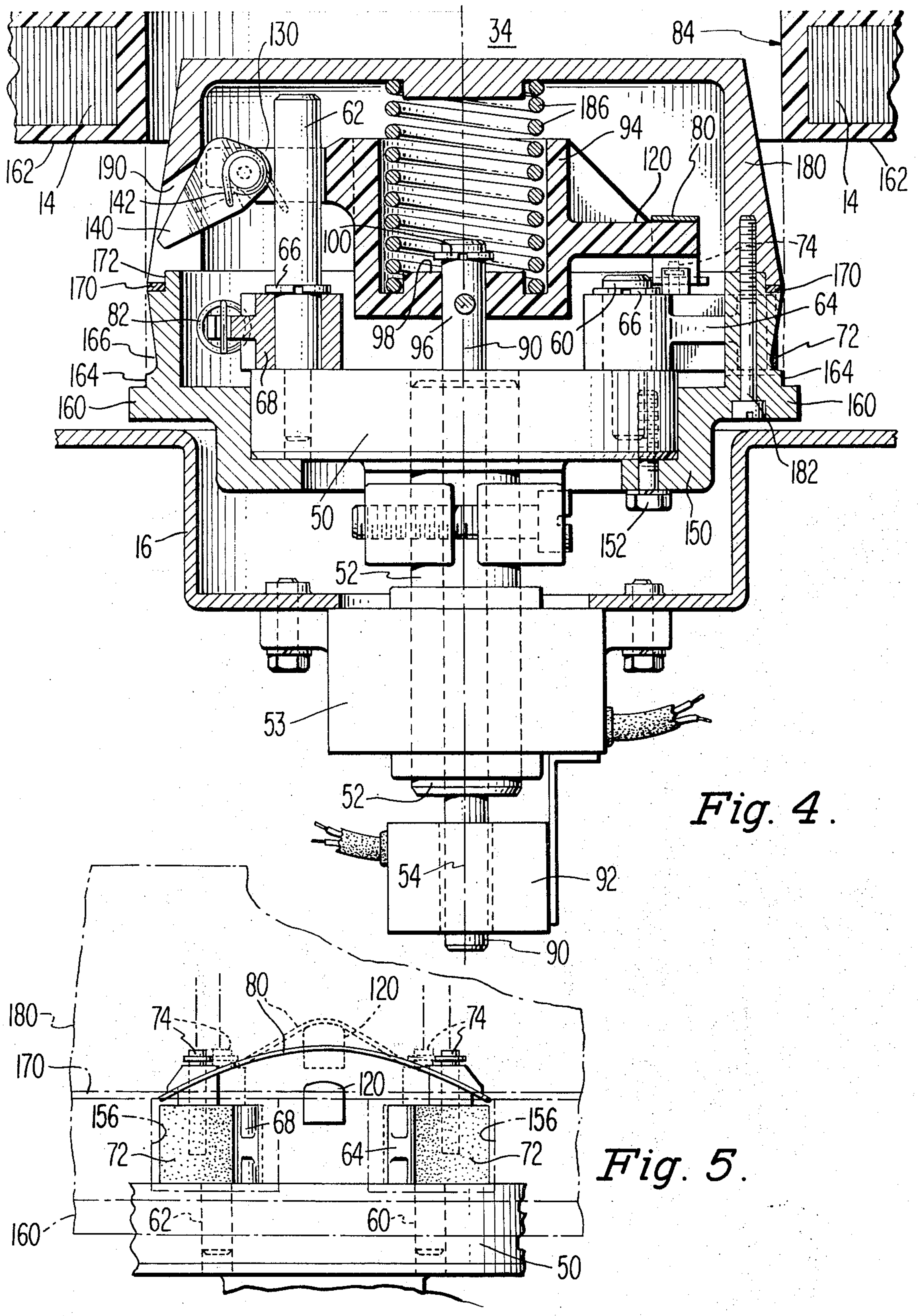
FIG. 4 is a cross-section taken along lines 3—3 of FIG. 2 with all elements in a position to permit tape reel disengagement, and including the cover which is removed in FIG. 2.
FIG. 5 is a cross-section taken along lines 5—5 of FIG. 2.

In FIG. 2 hub 34 is illustrated in detail, with the decorative cover shown in FIG. 1 removed so that the various elements of hub 34 are visible. FIGS. 3 and 4 are cross-sections of FIG. 2. As best seen in FIG. 4, a cylindrically shaped solid plate 50 is attached to a hollow drive shaft 52. The latter is driven by driving means 53, which may be a servo motor and which is secured to tape station backplate 16. Typically servo motors are substantially bigger than the tubes they drive but space limitations prevent motor 53 from being drawn in proper size relationship. When shaft 52 rotates it drives plate 50 and all of the various elements attached thereto. Projecting perpendicularly from plate 50, on the side opposite that on which motor 53 is located, are 6 cylindrical pins located a common circumferential distance from the rotational center 54 of plate 50 which is the rotational axis of shaft 52. Three relatively short pins 60 spaced 120° apart alternate with three relatively long pins 62 also spaced 120° apart. Pivotally attached to each pin 60 is a elongated element such as a clockwise drive dog 64 having a bore near one end in which the pin resides and extending to the inner surface 84 of tape reel 14 illustrated in phantom in FIG. 2 and in cross-section in FIGS. 3 and 4. An element 64 is held in place on a pin 60 by means of an expandable C-washer 66 which resides in a slot in pin 60. Likewise three counterclockwise drive dogs 68 are rotatably attached to the three long pins 62 by three C-rings 66. (As will be described more fully later, clockwise dogs 64 drive reel 14 in the clockwise direction while counterclockwise dogs 68 drive the reel in the counterclockwise direction.) Elements 64 are mirror images of elements 68 being rotated 180° about an axis extending along the length dimension. Each may comprise a cast portion 70 of any suitable material providing sufficient structural rigidity and a material 72 having a high coefficient of friction, such as rubber or polyurethane which is also preferably resilient. Material 72 which may be in the form of a brake shoe is removably attached if wear is a problem or bonded to one end of cast portion 70 and is shaped to conform (i.e., be generally parallel) to the inner surface 84 of tape reel 14. Ideally the surface of material 72 would have the same radius as the inner surface 84 of tape reel 14 so that contact between the two would occur over the entire surface of material 72. Due to the usual manufacturing tolerance problems, however, it has been found desirable to make the radius of member 72 slightly smaller than that of inner surface 84 of the tape reel. Also a slight radius in the opposite direction is present on the surface of member 72. That is, the surface of member 72 is somewhat spherical in shape. Therefore, only the center portion is usually in contact with the tape reel. This relatively small portion is, however, sufficient to provide the frictional area needed. Alternately the surface of material may be shaped to form a small acute angle with the inner surface of the reel such that the open end of the angle faces the direction of intended rotation of the hub.

As best seen in FIG. 2, elements 64 and 68 do not, when resting against tape reel 14, lie along center lines 73, which pass through the rotational center of plate 50 and the center of the area of contact of the element with the tape reel. Rather, elements 64 lie on one side of such center lines 73 while elements 68 lie on the other side.

A cylindrical pin 74 projects from the approximate longitudinal mid-point of each element 70 and extends in a direction parallel to that of pins 60 and 62. A strap 80 connects between a pin 74 on a clockwise drive dog 64 and a similar pin 74 on an adjacent counterclockwise drive dog 68. Three such straps connect pairs of elements 64 and 68. A tension spring 82 is coupled between a counterclockwise drive dog 68 and an adjacent clockwise drive dog 64. Three such springs 82 connect pairs of elements 68 and 64. That is, straps 80 and springs 82 alternate.

As best seen in FIG. 2, adjacent elements 64 and 68 are biased together by springs 82 until frictional elements 72 are moved by the biasing action into contact with the inner surface 84 of tape reel 14 shown in phantom. Straps 80 are of sufficient length to permit the engagement of frictional elements 72 and the inner surface 84 of tape reel 14.

A solid rod 90 (FIG. 4) residing within motor shaft 52 connects between a solenoid 92 located beyond the end of motor 53, on the side opposite that of tape reel hub 34, and an axially movable member such as a slider 94 located within the hub. Rod 90 is not rigidly connected to slider 94 but rather is connected in a manner which permits some movement of rod 90 about the direction of travel and some lateral movement. The connection includes a pin 96 which extends through the shaft in a direction normal to the shaft axis. This pin resides in an inverted U-shaped slot in the hub portion 98 of slider 94. Pin 96 and C-washer 100 residing in a slot on the shaft act to capture hub portion 98 between them.

Slider 94 comprises three radially extending projections 110 each of which partially surrounds a long pin 62. These provide guidance to and prevent rotation of member 94 as the latter is moved upward (as illustrated in FIG. 4) by solenoid 92. Slider 94 also includes three radially extending arm-like members 120, each of which extends beyond and beneath (as illustrated in FIG. 2) a different one of straps 80. The configuration is such that as slider 94 is raised (as illustrated in FIG. 2) arms 120 engage straps 80 causing elements 64 and 68 to be drawn together. Said another way, as slider 94 is raised, all elements 64 and 68 are drawn inward away from surface 84 of tape reel 14 to the positions shown by dashed lines in FIG. 2 for one pair of such elements.

Finally, slider 94 contains 3 additional radially extending portions 130 which alternate with arms 120 and which extend to a position over springs 82. Pivotally attached to each of extensions 130 about a shaft 132 is a reel seat finger 140. As best seen in FIG. 3 where one of the fingers is visible, they are prevented from pivoting above a position in which the lower surface is parallel to the surface of plate 50. This is accomplished by having a stop 134 on portion 130 against which portion 136 of finger 140 resides. The fingers 140 may pivot downward and consequently inward as illustrated in FIG. 4. They are, however, normally urged into the position shown in FIG. 3 by helical springs 142 coupling between projection 130 and finger 140. The purpose of the three fingers is to hold tape reel 14 in position on hub 34. The fingers may be pivoted down toward plate 50 to permit removal of reel 14 (FIG. 4).

A generally cylindrical housing 150 is secured by a plurality of fasteners 152 to plate 50. Housing 150 has about its periphery 6 slots or openings 156, best seen in FIG. 5, through which project elements 64 and 68. Housing 150 has shoulder portion 160 (FIG. 3) and the back surface 162 of tape reel 14 bears against this shoulder when the reel is in position on the hub. An annular portion of housing 164 located adjacent to shoulder 160 serves accurately to seat the tape reel, when it is in position. A portion 166 of the housing 150 is undercut to permit easy removal of tape reel 14 without binding.

A center ring 170 shown mostly broken away in FIG. 2 rests in an undercut portion 172 of housing 150. The outer diameter of ring 170 is the same as the outer diameter of portion 164 of the housing (i.e. slightly smaller than the diameter of the inner surface 84 of the tape reel). It serves to properly locate tape reel 14. Ring 170 could be formed as part of the housing 150 but by making it a separate piece, assembly of elements 64 and 68 into slots 156 is facilitated. A cover 180 is attached to the housing 150 by three screws 182. A compression spring 186 extends between cover 180 and the hub portion 98 of slider 94. Spring 186 urges slider 94 into the downward position (FIG. 3). Solenoid 92, when energized, forces the slider into the upward position (FIG. 4), overcoming the spring bias. Cover 180 and 3 openings 190 (one of which is shown in FIG. 3) through which projects fingers 140. As is best illustrated in FIG. 4, when slider 94 is in its upward position, the interaction of cover 180 and fingers 140 cause the fingers to be rotated downward and inward so as to permit removal of tape reel 14.

In operation, assume first that it is desired to load a tape reel onto hub 34. The operator first closes a switch (not shown) to energize solenoid 92. This moves slider 94 into the position shown in FIG. 4. As slider 94 is raised, fingers 140 come in contact with cover 180 thereby being forced downward and inward so that the ends of the fingers retract to a position clear of that to be occupied by the inner surface 84 of tape reel 14. Concurrently, extensions 120 on slider 94 engage and lift straps 80 pulling the three pairs of elements 64 and 68, to which the straps are attached, toward each other into positions corresponding to that shown in phantom in FIG. 2 for the lowermost pair.

The operator then inserts a tape reel 14 onto hub 34 so that the inner annular surface 84 rests on ring 170 and portion 164 of housing 150. Next the operator opens the switch (not shown) for solenoid 92 for deenergizing the solenoid. The compression spring 186 thereupon expands and moves slider 94 into the position shown in FIG. 3. As slider 94 moves, the 3 fingers 140 rotate outward past the inner surface 84 of the reel and at the same time the fingers are moved into contact with the outer face of reel 14. The final position of one of the fingers is shown in FIG. 3 and in this position it holds the reel against portion 160 of housing 150. Although in FIG. 3 hub portion 98 of slider 94 is illustrated as being parallel with plate 50, it may be that due to thickness variations in tape reel 14 or for some other reason, the reel is not seated against lip 160 over the entire circumference of the tape reel. In that event, slider 94 will tilt slightly until contact is achieved between each of the fingers 140 and the reel 14. This will cause no problem as shaft 92 is attached to the slider in such a way as to permit some flexibility between the slider and shaft. Further, the slots in the portion of projections which surround pins 62 are enlarged somewhat to permit a slightly canted positioning of the slider.

When slider 94 is in its downward position and therefore projections 120 are no longer in contact with straps 80, elements 64 and 68 are biased into light contact against inner surface 84 of tape reel 14, this light contact being assured by tension springs 82. The biasing may alternately be accomplished by centrifugal force caused by the rotating but will cause one or the other set of dogs to come in contact with the tape reel as will be described below. However the immediate contact of the dogs cuased by the springs ensures that the reel will begin to rotate concurrently with motion of the hub. There is no delay until centrifugal force can take effect. Then, as the hub is driven by motor 53 in either direction, say in a clockwise direction, reel 14 has a tendency to remain stationary. Since the reel tends to remain stationary, frictional pads 72 on elements 64 tend to remain stationary. However, due to the pivotal offset of pins 60, a wedging action occurs between elements 64 and tape reel 14. The more the tape reel resists turning the stronger becomes the wedging action until finally the tape reel rotates and will continue to rotate merely by being in contact with elements 64. This is the reason elements 64 are termed clockwise drive dogs. In a similar fashion, as the tape hub is driven in a counterclockwise direction by motor 53, elements 68 become wedged into contact with tape reel 14 and, therefore, force it to be driven in the counterclockwise direction.

When it is desired to demount reel 14, the operator stops the motor 53 and energizes the solenoid 92. The latter moves the slider 94 once again to the position shown in FIG. 4. This action retracts fingers 140 out of the way of the center portion of the tape reel and moves elements 64 and 68 out of contact with the inside surface 84 of the tape reel permitting it easily to be removed.

Although the invention has been described in terms of a hub for a tape station, it is applicable to any device which must be attached to a rotational driving means to be driven thereby and yet which must be easily removable from the driving means. Only one set of elements 64 or 68 is needed if the load need only be driven in a single direction. Further, the number of such elements depends on the size of the load. For a very light load only one element may be needed. Finally while the load illustrated (tape reel 14) has an inner opening cooperating with the rotationally driven hub 34, a load having only an outer cylindrical surface may also be driven by a hub having inwardly extending drive dogs 64 and/or 68 and inwardly extending fingers 140. The load while commonly having a cylindrically shaped portion may have any shape which is revolved about a common axis (i.e. possess an inner or outer annular portion). Examples are conical elements and donut-shaped elements. The load further need be this shape only in the vicinity of the hub. Other portions may be any shape.

What is claimed is:

1. An arrangement for locking to a hub the annulus of a load to be rotated by said hub comprising, in combination:

an elongated dog pivotally mounted at one end to the hub;

said dog including on the opposite end a friction surface facing said annulus, the pivotal connection between the dog and hub lagging a line joining the axis of rotation of the hub and the center of said friction surface, relative to the intended direction of rotation of the hub; the angle between said dog and said line being less than 45°, the pivotal axis being parallel to said axis of rotation of said hub;

means attached to the hub engaging a portion of the annulus generally opposite to the portion of the annulus in contact with the dog; and biasing means coupled to said dog for biasing said dog about its pivotal mounting in a direction to cause said surface to wedge against said annulus, whereby when siad hub is rotated in said intended direction, wedging action between the load annulus and friction surface tends to lock the load and dog together and to cause the load to rotate with the hub.

2. An arrangement as set forth in claim 1 wherein said friction surface has a radius of curvature somewhat smaller than that of said annulus and initially is biased in contact with said annulus at the center portion of said surface.

3. An arrangement as set forth in claim 1 further including a plurality of other dogs as described in claim 1, each with a friction surface and each having a biasing means, all dogs being equally spaced from one another and from said axis of rotation.

4. An arrangement as set forth in claim 1 further including means creating a force on said dog in a direction generally tangential to said annulus at the point of contact with said dog for rotating said dog about its pivotal connection in a direction opposite to the bias direction for moving said friction surface out of contact with said annulus.

5. An arrangement as set forth in claim 1 further including means engaging a portion of the annulus comprising at least one other dog similar to the dog claimed.

6. An arrangement for locking the annulus of a driven load to a hub comprising, in combination:

two elongated dogs, each pivotally mounted at one end to the hub;

each dog including a friction surface facing the annulus on the opposite end of the dog, the pivotal connection between one dog and the hub lying on one side of a line joining the axis of rotation of the hub and the center of its friction surface, the angle between said dog and said line being less than 45°, and the pivotal connection between the other dog and the hub lying on the other side of a second line joining the axis of rotation of the hub and the center of its friction surface, the angle between said other dog and said second line being less than 45°; and biasing means coupled to said dogs for urging each around its pivotal mounting in a plane substantially normal to said axis of rotation in a direction to wedge its friction surface with said annulus, whereby when the hub is rotated said wedging between the annulus and one of said friction surfaces tends to lock the load and dog having said one of said friction surfaces together and to cause the load to be rotated with the hub, one surface locking with the annulus depending upon the direction of rotation of the hub.

7. Apparatus for rotating a load, having a revolved contour shape, about the axis of revolution of said load comprising, in combination:

rotationally driven means supporting a portion of the load but permitting rotation therebetween;

elongated means pivotally mounted at one end to said rotationally driven means, the other end portion of which is in frictional engagement with said load, the pivotal axis of said elongated means lying on the trailing side, relative to the direction of rotation of said rotationally driven means, of a line joining the driven means axis to the mid-point of contact between said elongated means and said load, the angle between said line and a second line extending between said pivotal axis and said mid-point of contact being less than 45°; and biasing means coupled to said elongated means for biasing said means about its pivotal mounting in a direction to cause said other end portion to wedge against said revolved contour shape of said load, whereby when said rotationally driven means is rotated, said wedging between the load and said other end tends to lock the said lock and said elongated means together and to cause the load to rotate with the hub.

8. The combination as set forth in claim 7 wherein said rotationally driven means may be driven in either direction and further including a second elongated means similar to the first but having its pivotal axis lying on the opposite side of another line joining said driven means axis and the midpoint of contact between said second elongated means and said load, the angle between a line joining said pivotal axis of said second means with its midpoint of contact and said another line being less than 45°, whereby one of the pivotally mounted means prevents relative rotation between the load and driven means depending on the direction in which the load is driven.

9. The combination as set forth in claim 7 further including means coupled to said elongated means for pivoting said elongated means away from contact with said load in a direction substantially tangential to said load at said point of contact for permitting removal thereof.

10. The combination as set forth in claim 9 further including a member movable axially of said rotationally driven means and means for urging said member toward said rotationally driven means, said member including a plurality of fingerlike elements projecting normal to the direction of movement of said member for holding said load against said rotationally driven means.

11. The combination as set forth in claim 10 wherein said fingerlike elements are pivotable about said member and wherein said apparatus further includes means for concurrently pivoting said fingerlike elements so that said fingerlike elements do not engage said load thereby permitting the removal of said load.

12. The combination as set forth in claim 10 wherein said member includes means for permitting each fingerlike element to move independently of the others in a direction substantially axially of said rotationally driven means for holding a load in contact with said rotationally driven means.

13. An arrangement for removably holding a load comprising, in combination:

a member including a reference surface against which said load is to be held;

movable means coupled to said member and movable between two positions, the first closer to the reference surface than the second;

means including a plurality of cam surfaces oppositely disposed and in fixed positions relative to said reference surface; and a plurality of fingerlike elements pivotally attached to said movable means, each of the pivotal axes lying substantially parallel to its related cam surface each fingerlike element being in line with one of said cam surfaces, each fingerlike element biased about its pivotal attachment to an extended position over and engaged with said load for holding said load against said reference surface when said movable means is in its first position, and said fingerlike elements engaging the respective cam surfaces and pivoting about their pivotal attachments to retracted positions while moving away from said load when said movable means is moved to its second position.

14. An arrangement as set forth in claim 13 wherein said load comprises a tape reel formed with a central opening therein and wherein said fingerlike elements are pivotally attached to a portion of the movable means within a space coextensive with said central opening and are biased to a position such that the ends of the elements extend beyond the opening and bear against the exposed surface of the tape reel for holding the tape reel against the reference surface when the movable means is in its first position.

15. An arrangement as set forth in claim 14, further including:

a plurality of load engaging elements pivotally mounted on said reference surface, each element normally biased into engagement with the surface defining the opening in said tape reel; and means coupled between said movable means and said load engaging elements for moving the load engaging elements about their pivotal mountings in a direction opposite to the bias direction for releasing said tape reel in response to movement of said movable means to its second position.

16. Apparatus for removably securing a tape reel having a central opening therein to a supporting surface of a hub comprising, in combination:

movable means projecting through the opening in said tape reel and movable in directions toward and away from said supporting surface;

a plurality of fingerlike elements pivotally mounted to said movable means and biased to a position such that the free ends of said elements extend over a surface of the reel opposite that which abuts said supporting surface, thereby holding the reel against said supporting surface when said movable means is in a position relatively close to said supporting surface; and means responsive to movement of said movable means to a second position spaced further from said reference surface for pivoting said elements about their mountings to retracted positions while said elements are being lifted from the tape reel surface for permitting removal of said reel.

17. The combination as set forth in claim 16 wherein each of said elements is movable independently of the others in the direction of movement of the movable means for securing a reel which is dimensionally uneven around its circumference between its side walls.

18. An arrangement for securing a tape reel having a central opening therein to a rotatable hub comprising, in combination:

a plurality of elongated dogs each pivotally attached at one end to said hub, the pivot axes located within said reel opening and parallel to said hub axis of rotation, the opposite end of each dog including a frictional surface;

means for urging said opposite end of each dog into contact with the wall forming the opening in said reel, said pivot axes being behind lines extending between the hub axis and mid-point of contact between said dogs and reel, relative to the intended direction of hub rotation;

means slidably mounted to said hub movable axially of the hub and extending through said opening in said reel;

a plurality of elements pivotally mounted to said slidable means and biased in a direction to cause said elements to extend in a direction generally normal to said hub axis with the ends of the elements extending beyond the central opening of the reel, whereby when said slidable means is urged toward said hub, said elements secure said reel against said hub, and when said hub is rotated, wedging action between said dogs and reel tends to lock the reel rotationally to the hub to be rotated therewith.

19. The combination as set forth in claim 18 further including:

means coupled between said dogs and slidable means for moving said dogs away from contact with said reel as siad slidable means moves away from said hub;

means for pivoting said elements toward said hub and inward toward said hub axis as said slidable means moves away from said hub; and means for moving said slidable means away from said hub to move said dogs and elements to permit removal of said reel.

* * * * *